(12) United States Patent
Tsai

(10) Patent No.: US 6,282,078 B1
(45) Date of Patent: Aug. 28, 2001

(54) CAPACITOR FOR CAR STEREO WITH CURRENT DISTRIBUTING CAPABILITY

(75) Inventor: Liao-Tai Tsai, Taipei (TW)

(73) Assignee: Real Power Cap Company, Taipei (TW)

( * ) Notice: Subject to any disclaimer, the term of this patent is extended or adjusted under 35 U.S.C. 154(b) by 0 days.

(21) Appl. No.: 09/551,730

(22) Filed: Apr. 18, 2000

(51) Int. Cl.[7] .................................................. H01G 4/35
(52) U.S. Cl. ..................... 361/302; 361/303; 361/306.1; 361/307
(58) Field of Search ................................... 361/302, 329, 361/308.3, 736, 748, 306.1, 307, 303, 749, 807, 809, 811, 766, 767, 763

(56) References Cited

U.S. PATENT DOCUMENTS 4,173,745 * 11/1979 Saunders ........................... 333/182

5,617,307 * 4/1997 Guigueno ........................... 363/37

FOREIGN PATENT DOCUMENTS 2-740932 * 5/1997 (FR) .

* cited by examiner

*Primary Examiner*—Anthony Dinkins
(74) *Attorney, Agent, or Firm*—Birch, Stewart, Kolasch & Birch, LLP

(57) ABSTRACT

An apparatus for car stereo includes a capacitor and two spaced apart conductors connected to the capacitor wherein each conductor includes wire holes and fastening holes perpendicular to and in communication with wire holes such that a fastener is inserted into fastening hole to fasten cable in the wire hole. With this, output current of battery can be distributed to respective loads through the conductors without the necessity of installing a distributor in electrical system of car stereo.

18 Claims, 8 Drawing Sheets

CAPACITOR FOR CAR STEREO WITH CURRENT DISTRIBUTING CAPABILITY

BACKGROUND OF THE INVENTION

1. Field of Invention

The present invention relates to capacitor and more particularly to a capacitor for car stereo with current distributing capability.

2. Related Art

Conventionally, battery is used to supply power to electrical system of an automobile. It is also found that the output power of battery is not sufficient when car stereo suddenly needs a large amount of current. As such, a capacitor is inserted in parallel with and between stereo amplifier and battery. This technique can provide a sufficient current in a short period of time such as the starting of stereo. This capacitor also acts as filter.

A conventional capacitor module 30 is shown in FIG. 1 comprising a capacitor, a circuit board, and a transparent cover. Circuit board is provided on the top of capacitor having a digital display and a status indicator electrically connected thereto. User may see voltage or current value and the connection between positive and negative terminals for determining whether capacitor module 30 functions well. This can eliminate the necessity of using multimeter. Additionally, a relay may be inserted in the circuit board. This relay acts to close the digital display when an error occurs in the connection of positive and negative terminals of capacitor module 30, thereby eliminating the necessity of inserting an additional protection loop in the circuit board.

In the configuration shown in FIG. 1, capacitor module 30, cable 25, and distributor 20 are electrically connected together. In detail, positive terminals of battery 10 and capacitor module 30 are connected to distributor 20, while negative terminals thereof are connected to ground. As such, output current of battery 10 can be distributed to respective loads 50 (e.g., load 1 to load n) through distributor 20. Further, capacitor module 30 serves as providing a peak current to each load 50. However, the previous design suffered from several disadvantages: 1) the procedure is somewhat complex, and 2) wiring is messy. As such, a simplified procedure and neat wiring are desirable.

SUMMARY OF THE INVENTION

It is an object of the present invention to provide a capacitor for car stereo such that output current of battery can be distributed to respective loads through capacitor without the necessity of installing a distributor in electrical system of car stereo.

To achieve the above and other objects, the present invention provides an apparatus for car stereo with current distributing capability comprising a capacitor, a circuit board, two conductors, and a terminal assembly wherein the spaced apart conductors are provided on the top of capacitor between circuit board and cover of conventional capacitor module, each conductor is penetrated through a terminal hole such that first conductor and second conductor may electrically connect to the negative electrode and positive electrode of capacitor respectively, the first conductor having at least one pair of fastening hole and wire hole and the second conductor having plural pairs of the fastening hole and wire hole for current distributing, each of the pairs of wire hole and fastening hole perpendicular to and in communication with wire holes such that cable may pass through wire hole to reach the bottom of the corresponding fastening hole, and thereafter a fastener is used to pass through fastening hole to fasten the cable to finish the connection of cable to conductors.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

Figure 1:
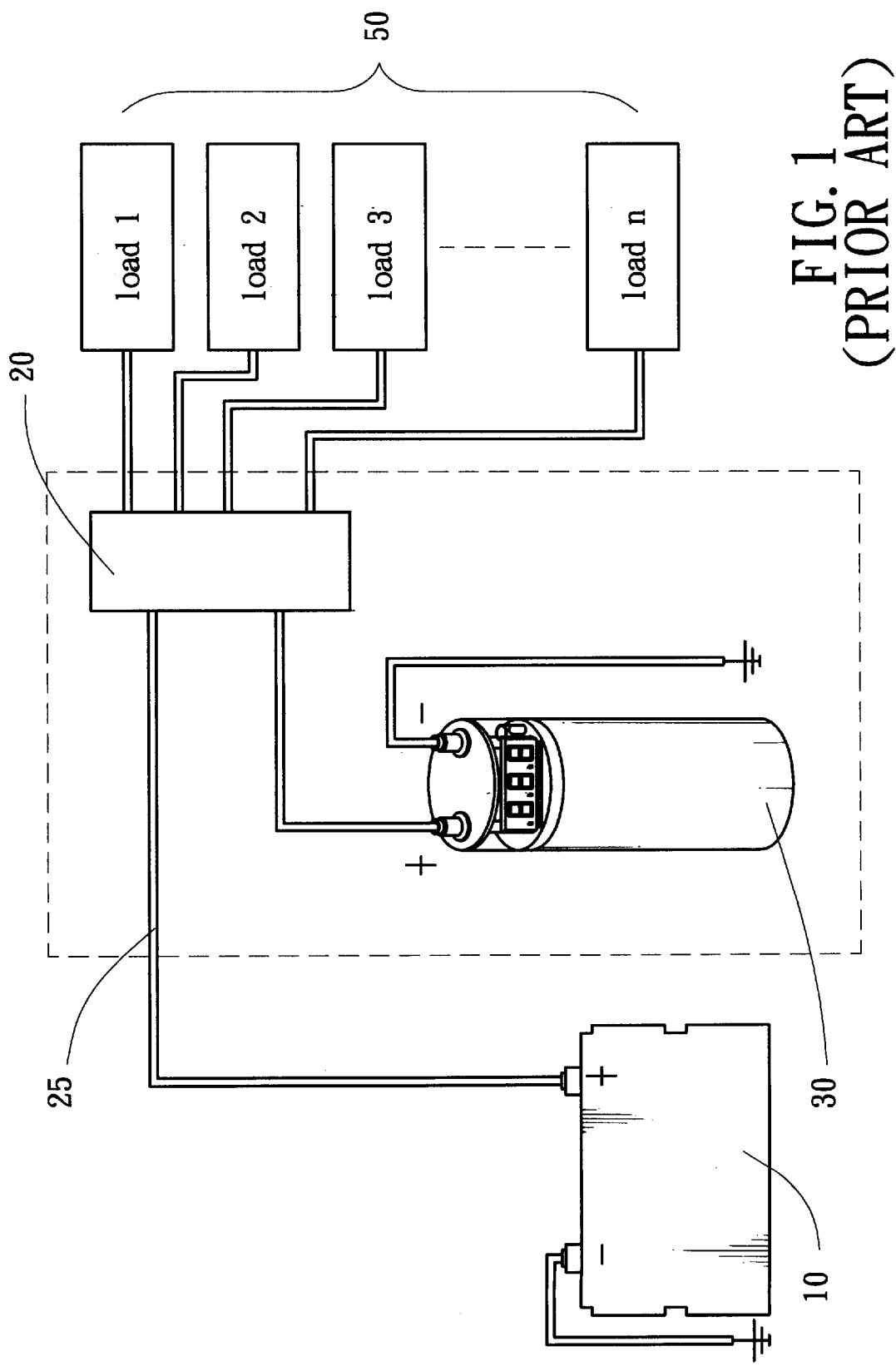
FIG. 1 is a view schematically showing a conventional connection of capacitor module, battery, distributor, and load.
Figure 2:
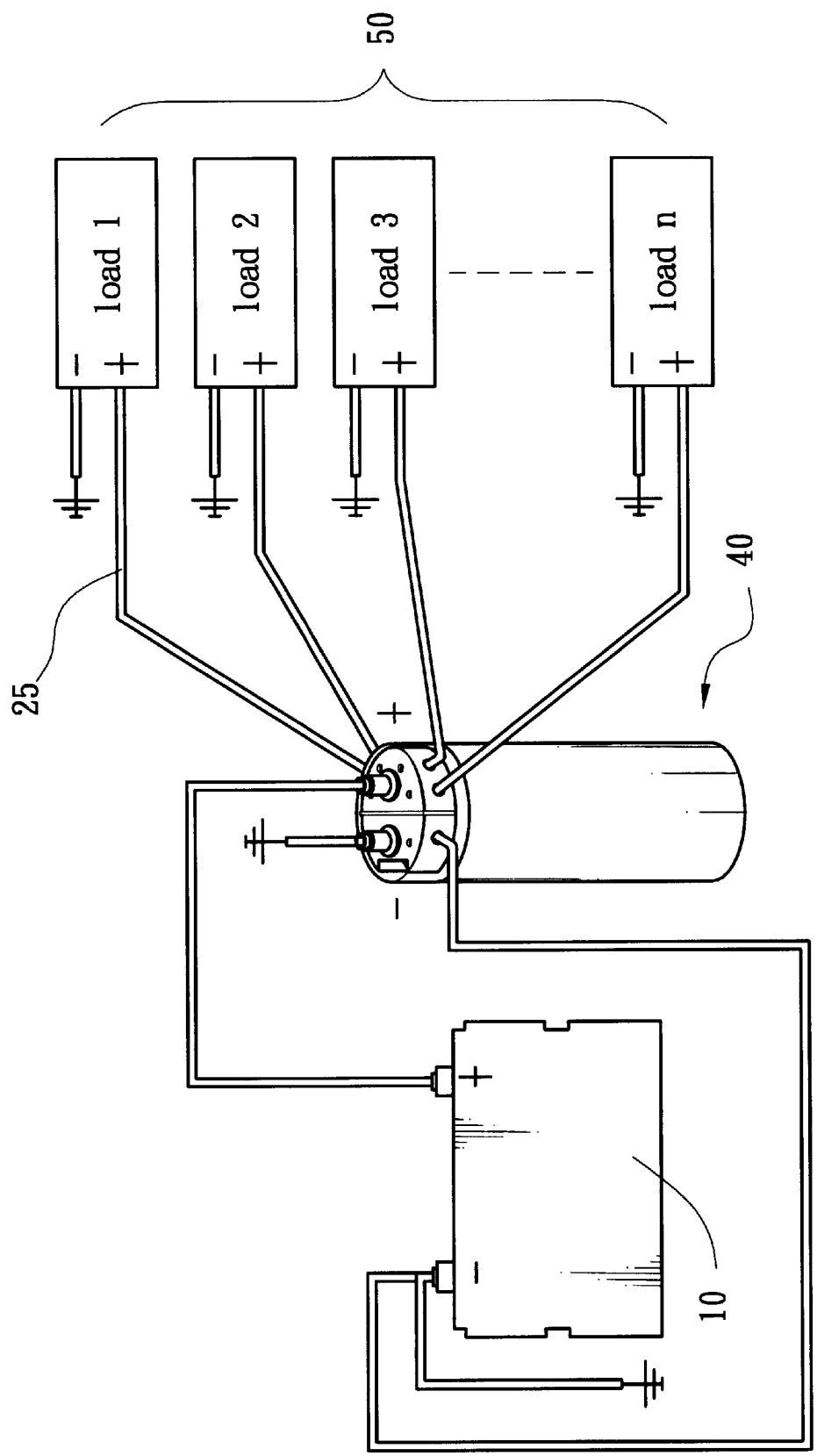
FIG. 2 is a view schematically showing a connection of capacitor module, battery, and load according to the invention.

Referring to FIG. 2, there is shown a capacitor module 40 for car stereo with current distributing capability constructed in accordance with the invention. Capacitor module 40 is electricity connected between battery 10 and respective loads 50 (e.g., load 1 to load n) through cables 25.

Figure 3:
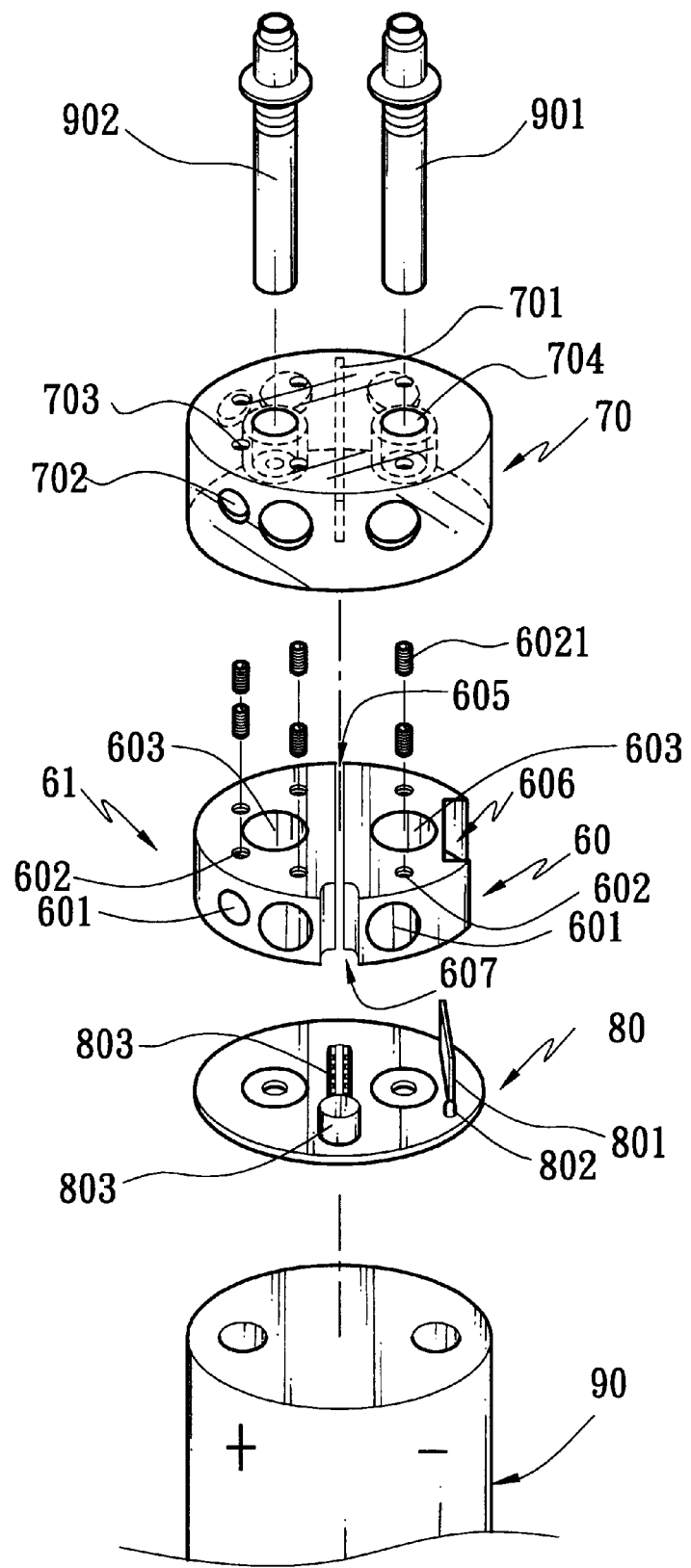
FIG. 3 is an exploded view of a first preferred embodiment of capacitor module according to the invention.

Referring to FIG. 3, capacitor module 40 of the invention comprises a capacitor 90, a circuit board 80, a cover 70, a terminal assembly consisting of negative terminal 901 and positive terminal 902, and first conductor 60 and second conductor 61 provided between circuit board 80 and cover 70. A digital display 801 and a status indicator 802 are provided on circuit board 80 for showing voltage or current value and the connection between positive and negative terminals respectively. Thus user may determine whether capacitor module 40 functions well. Conductors 60 and 61 may be semicircular, rectangular, or irregular shape. It is important to note that the bottoms of conductors 60 and 61 should have a shape matingly conform to that of IC element for securing conductors 60 and 61 to circuit board 80. For example, IC element is strip-like being protruded above the center of IC element as shown. Accordingly, a strip-like receiving member 607 is provided in center of the bottom of either conductor 60 or conductor 61. Further, a recess 606 is provided on a side of conductor 60 for receiving the protruded digital display 801 and status indicator 802. Note that it is possible that recess 606 is provided in conductor 61 in the other embodiment. This has the benefits of effecting a sightly design and allowing user to see voltage value, current value, or other electrical characteristics as implemented in prior art.

In assembly, second conductor 61 and first conductor 60 may electrically connect to the positive and negative electrodes of capacitor 90 through positive terminal 902 and negative terminal 901 respectively. Conductors 60 and 61 are substantially parallel and spaced apart by a gap 605 for preventing conductors 60 and 61 from contacting each other to otherwise cause short circuit. Further, an insulator 701 is provided in cover 70 for matingly conforming to gap 605. As a result, insulator 701 is inserted into gap 605 when cover 70 is capped on the conductors 60 and 61. This further enhances the insulation between conductors 60 and 61.

Referring to FIGS. 2 and 3, capacitor module 40 is parallel connected to battery 10 when installing capacitor module 40 in the electrical system of car stereo. That is, positive terminal of battery 10 is connected to positive terminal 902 of capacitor module 40, while negative terminal of battery 10 is connected to first conductor 60 of capacitor module 40. Further, positive terminal of each load 50 (e.g., load 1, load 2, . . . , or load n) is connected to second conductor 61. Also, negative terminals of battery 10, capacitor module 40, and loads 50 are all connected to ground. With this configuration, output current of battery 10 can be distributed to respective loads 50 (e.g., load 1 to load n) through capacitor 90 and first conductor 60. This means that capacitor module 40 of invention has the current distributing capability.

Figure 4:
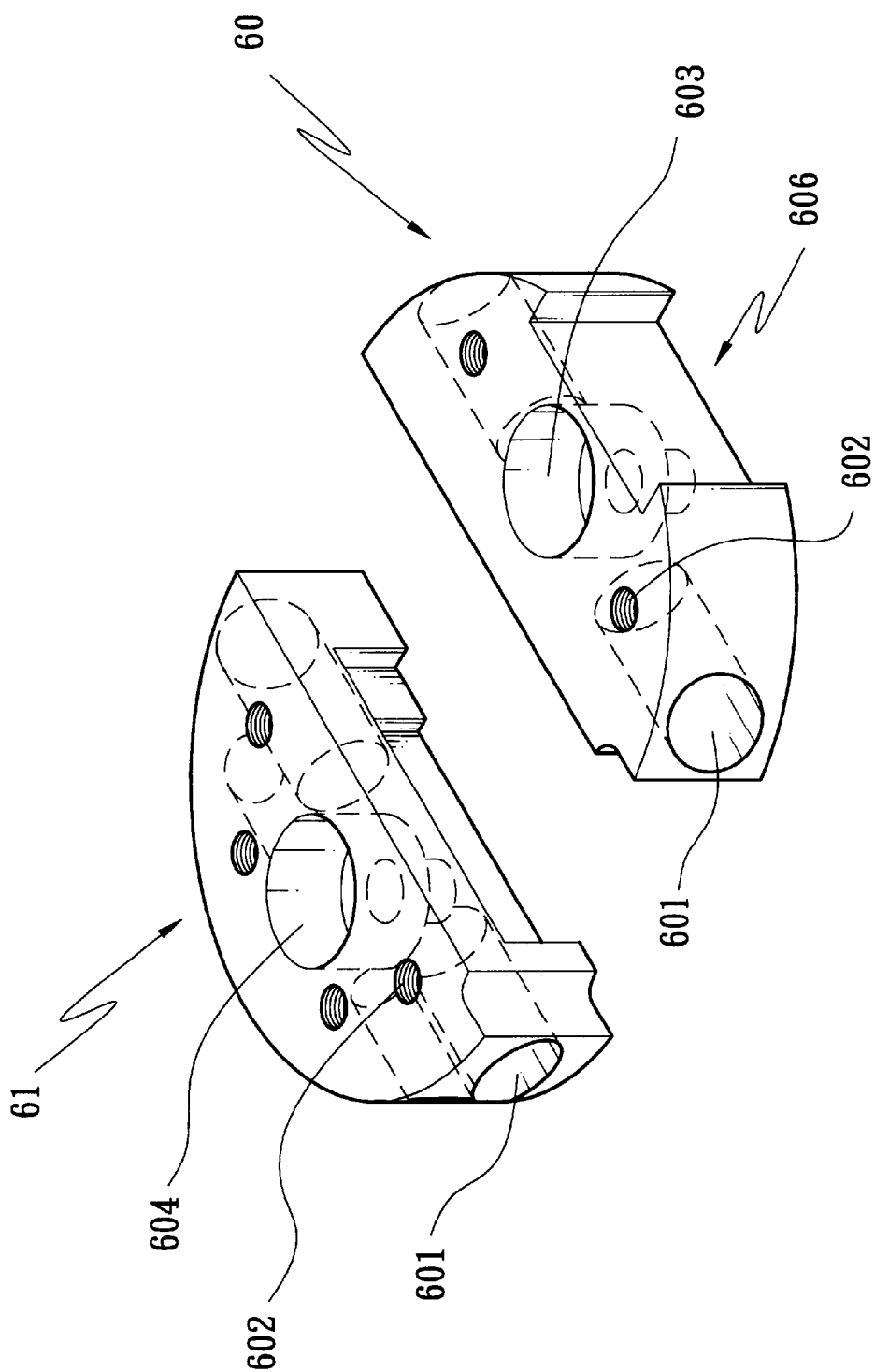
FIG. 4 is a perspective view schematically showing conductors shown in FIG. 3.

Referring to FIG. 4, a detail description of the construction of capacitor module 40 is illustrated. As shown, first conductor 60 has a plurality of pairs of wire hole 601 and fastening hole 602. Similarly, second conductor 61 has the same number pairs of wire hole 601 and fastening hole 602. Each wire hole 601 and fastening hole 602 are perpendicular to and in communication with each other. As such, cable 25 can be secured to conductors 60 and 61 by inserting in the wire hole 601 as detailed in the assembly later.

Figure 5:
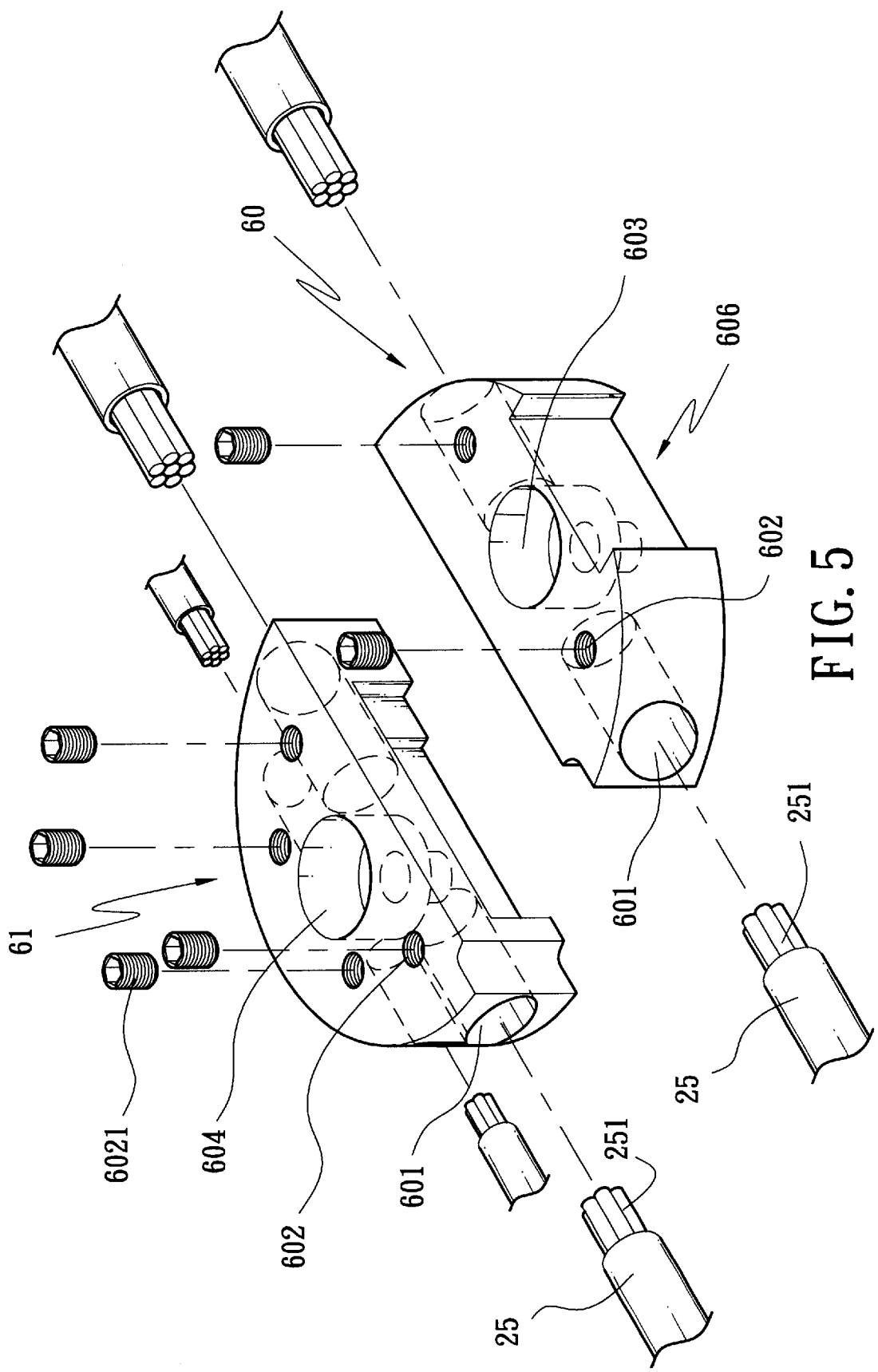
FIG. 5 is similar to FIG. 4, prior to assembling conductors and cables.
Figure 6:
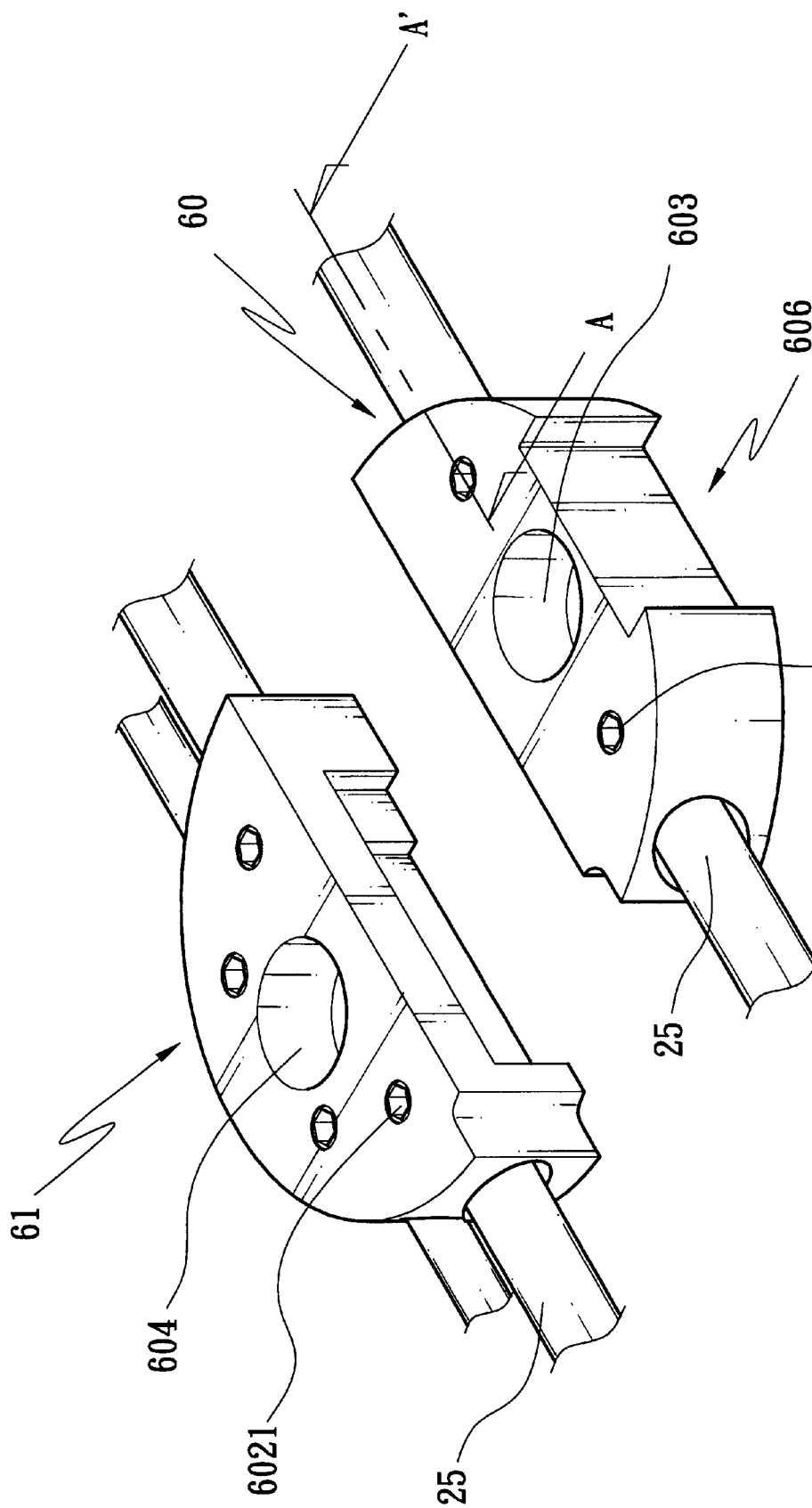
FIG. 6 is similar to FIG. 5, conductors and cables being assembled.
Figure 7:
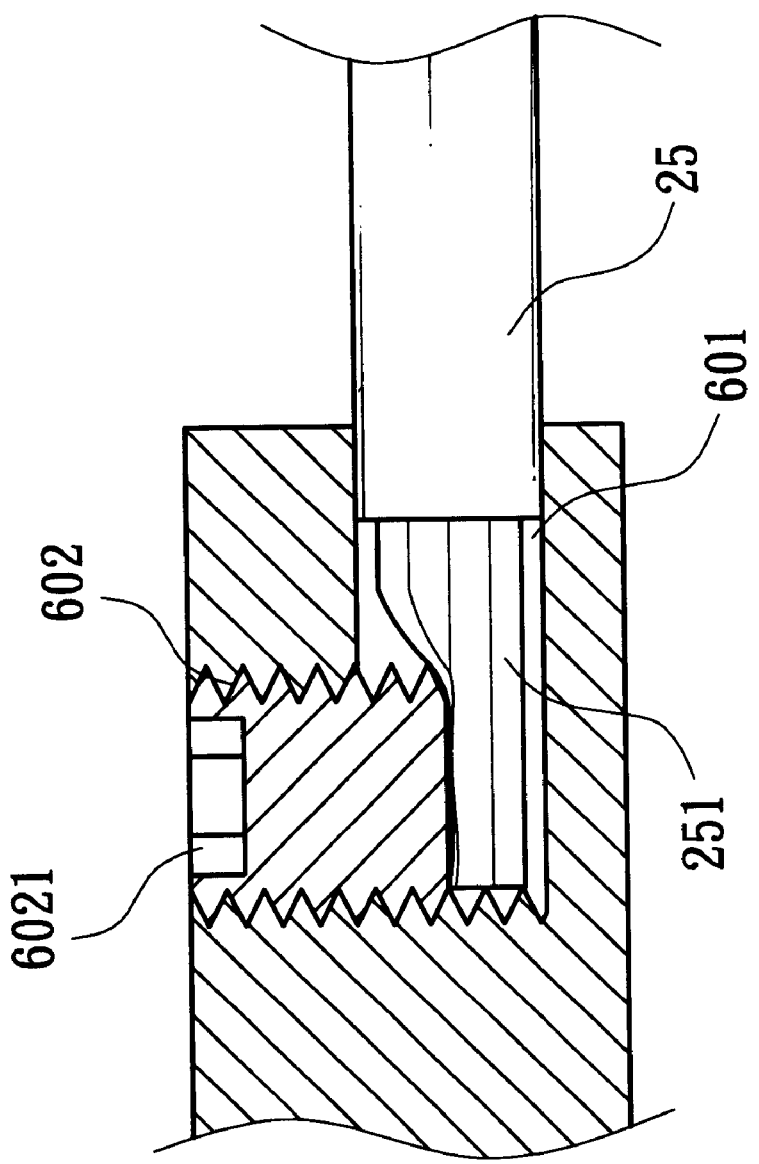
FIG. 7 is a sectional view taken along the line A—A of FIG. 6.

Referring to FIGS. 5, 6, and 7, first strip the end portion of cable 25 to unshielded copper wires 251. Then insert cable 25 in wire hole 601 with copper wires 251 completely received in the wire hole 601 and reached the bottom of fastening hole 602. Finally, use a fastener 6021 such as screw to thread through fastening hole 602 until fasten copper wires 251 in place at the bottom of fastening hole 602. This finishes the fastening of cable 25 in conductors 60 and 61 (see FIG. 6).

The sectional view shown in FIG. 7 further illustrates the fastening of copper wires 251 in the bottoms of wire hole 601 and fastening hole 602 by means of fastener 6021.

It is understood that one pair of wire hole 601 and fastening hole 602 may have bores different than the other pair of wire hole 601 and fastening hole 602 for being adapted to various sizes of cables 25. As such, a variety of cables 25 may secure to conductors 60 and 61.

It is also understood that the configuration of wire hole 601 and fastening hole 602 is not limited to that shown in FIG. 6. For example, both wire holes 601 and fastening holes 602 have internal threads, i.e., they are identical. As such, cable 25 may insert into fastening hole 602, while fastener 6021 may thread through wire hole 601. This also achieves the fastening of cable 25 in conductors 60 and 61. Another configuration is implemented as wire hole 601 provided on top of any of conductor 60 and 61, while fastening hole 602 provided on a side of any of conductor 60 and 61. This still also achieves the fastening of cable 25 in conductors 60 and 61.

It is necessary that the same number of wire aperture 702 and fastening aperture 703 as that of wire hole 601 and fastening hole 602 are provided in cover 70 in addition to the original terminal holes 704 which are provided for allowing negative terminal 901 and positive terminal 902 to pass through. Referring to FIG. 2 again, it is designed that cable 25 may insert in wire aperture 702 and wire hole 601, while fastener 6021 may thread through fastening aperture 703 and fastening hole 602. As such, cable 25 may be secured at the bottoms of wire hole 601 and fastening hole 602.

Figure 8:
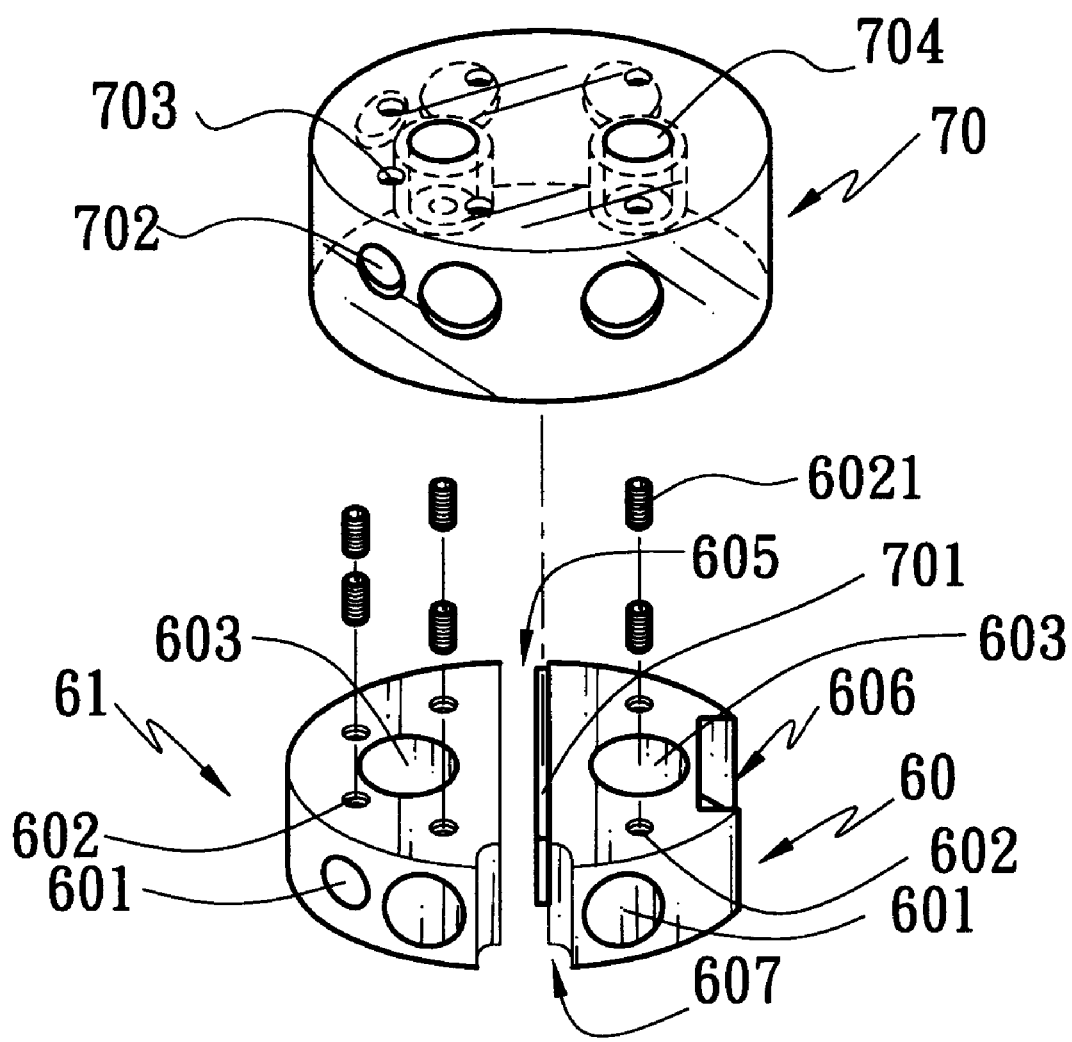
FIG. 8 is an exploded view of a second preferred embodiment of capacitor module according to the invention, where capacitor and circuit board removed.

Referring to FIG. 8, there is shown a second preferred embodiment of insulators. In comparison with the insulator 701 shown in first preferred embodiment, insulator 701 conformed to gap 605 is separated from cover 70 to secure between conductors 60 and 61. This not only achieves the insulation between conductors 60 and 61 but also has the benefit of without registering cover 70 with conductors 60 and 61.

This invention has the advantages of eliminating distributor and other associated cables, resulting in a reduction in the manufacturing cost. Further, a variety of wire holes are provided for being adapted to various cables. This can achieve the purpose of adjusting the nominal current value of cable.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for car stereo with current distributing capability, comprising:
   a capacitor;
   a circuit board provided on the top of the capacitor including a digital display and a status indicator;
   a conductor means comprising a first conductor and a second conductor spaced apart from the first conductor, the conductor means provided on the top of said circuit board, the first conductor having at least one pair of wire hole and fastening hole and the second conductor having plural pairs of the wire hole and the fastening hole; and
   a terminal assembly having a positive terminal and a negative terminal passed through the conductor means and the circuit board to electrically connect to a positive electrode and a negative electrode of the capacitor respectively;
   wherein an output current of a battery is distributed to load through the capacitor, the circuit board, the conductor means, and the terminal assembly.

2. The apparatus of claim 1, further comprising a cover provided on the conductor means.

3. The apparatus of claim 2, wherein the conductor means is provided between the circuit board and the cover.

4. The apparatus of claim 1, wherein the wire hole and the fastening hole are perpendicular to and in communication with each other.

5. The apparatus of claim 4, further comprising a fastener inserted into the fastening hole to fasten cable received in the wire hole.

6. The apparatus of claim 1, wherein the first conductor further comprises a positive terminal aperture and the second conductor further comprises a negative terminal aperture with the positive terminal and the negative terminal passed through respectively.

7. The apparatus of claim 1, further comprising a gap provided between the first and the second conductors.

8. The apparatus of claim 7, further comprising an insulator in the gap.

9. The apparatus of claim 8, wherein the insulator is connected to the cover.

10. The apparatus of claim 1, wherein the wire hole is provided on the top of the conductor means and the fastening hole is provided on the side of the conductor means.

11. The apparatus of claim 1, wherein the fastening hole is provided on the top of the conductor means and the wire hole is provided on the side of the conductor means.

12. The apparatus of claim 1, wherein the fastening hole is a threaded hole.

13. The apparatus of claim 1, where in the wire hole is a threaded hole.

14. The apparatus of claim 1, wherein the second conductor has one pair of the fastening hole and the wire hole having sizes different from of the other pair the fastening hole and the wire hole for receiving various cables.

15. The apparatus of claim 14, wherein each of the cables has a maximum current value being proportional to the diameter of the cable.

16. The apparatus of claim 3, wherein the bottom of the conductor means is shaped to conform to the top of the circuit board for being matingly engaged.

17. The apparatus of claim 1, wherein the conductor means further comprises a recess on the side for receiving the digital display.

18. The apparatus of claim 1, wherein the conductor means further comprises a recess on the side for receiving the status indicator.

* * * * *